United States Patent
Kwon et al.

(10) Patent No.: US 10,650,772 B2
(45) Date of Patent: May 12, 2020

(54) DISPLAY DEVICE

(71) Applicant: Samsung Display Co., Ltd., Yongin-si, Gyeonggi-do (KR)

(72) Inventors: Sangan Kwon, Cheonan-si (KR); Junpyo Lee, Asan-si (KR); Kyunho Kim, Hwaseong-si (KR); Sungjin Kim, Gwangju (KR); Yong-jin Shin, Asan-si (KR); Neung-beom Lee, Hwaseong-si (KR); Kyung-hwa Lim, Yongin-si (KR); Myungbo Sim, Yesan-gun (KR); Jinhyuk Jang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 4 days.

(21) Appl. No.: 16/166,915

(22) Filed: Oct. 22, 2018

(65) Prior Publication Data

US 2019/0122630 A1 Apr. 25, 2019

(30) Foreign Application Priority Data

Oct. 25, 2017 (KR) .......................... 10-2017-0139535

(51) Int. Cl.
*G09G 3/36* (2006.01)
*G02F 1/1335* (2006.01)

(52) U.S. Cl.
CPC ..... *G09G 3/3696* (2013.01); *G02F 1/133514* (2013.01); *G09G 3/3614* (2013.01); *G09G 3/3648* (2013.01); *G09G 3/3655* (2013.01); *G02F 2201/121* (2013.01); *G02F 2201/123* (2013.01); *G09G 2310/0264* (2013.01); *G09G 2320/0257* (2013.01);

(Continued)

(58) Field of Classification Search
CPC ....... G09G 2320/0257; G09G 2320/10; G09G 2320/103; G09G 2320/106
See application file for complete search history.

(56) References Cited

U.S. PATENT DOCUMENTS

| | | | |
|---|---|---|---|
| 5,402,141 A * | 3/1995 | Haim | ................... G09G 3/3607 345/88 |
| 7,724,228 B2 | 5/2010 | Lee et al. | |
| 7,907,106 B2 | 3/2011 | Shin et al. | |

(Continued)

FOREIGN PATENT DOCUMENTS

| KR | 10-0517500 B1 | 9/2005 |
|---|---|---|
| KR | 10-0864980 B1 | 10/2008 |

(Continued)

*Primary Examiner* — Dong Hui Liang
(74) *Attorney, Agent, or Firm* — Lewis Roca Rothgerber Christie LLP

(57) ABSTRACT

A display device includes: a display panel comprising a display area configured to display an image, wherein the display area includes a measurement area including a plurality of sub-measurement areas, and each of the plurality of sub-measurement areas includes a plurality of pre-map areas; a data driver configured to provide data voltages to the display panel; a signal controller; and a common voltage generator configured to provide a common voltage to the display panel, wherein an afterimage reduction mode is driven to change a level of the common voltage provided by the common voltage generator when the determined pre-map areas are adjacent to each other.

20 Claims, 13 Drawing Sheets

(52) U.S. Cl.
CPC ............... *G09G 2320/0276* (2013.01); *G09G 2320/0673* (2013.01); *G09G 2320/103* (2013.01); *G09G 2360/16* (2013.01)

(56) References Cited

U.S. PATENT DOCUMENTS

| | | | |
|---|---|---|---|
| 9,721,516 B2 | 8/2017 | Kim et al. | |
| 2008/0297674 A1* | 12/2008 | Sakamoto | G02F 1/133555 349/37 |
| 2009/0009455 A1* | 1/2009 | Kimura | G09G 3/2074 345/89 |
| 2010/0097307 A1 | 4/2010 | Chen | |
| 2014/0085348 A1* | 3/2014 | Tsuda | G09G 3/3614 345/690 |
| 2016/0189656 A1* | 6/2016 | Park | G09G 3/006 345/694 |
| 2018/0012332 A1* | 1/2018 | Ishihara | G06T 3/20 |

FOREIGN PATENT DOCUMENTS

| | | |
|---|---|---|
| KR | 10-0927014 B1 | 11/2009 |
| KR | 10-1005956 B1 | 1/2011 |
| KR | 10-1043672 B1 | 6/2011 |
| KR | 10-1100889 B1 | 1/2012 |
| KR | 10-1127856 B1 | 3/2012 |
| KR | 10-1182490 B1 | 9/2012 |
| KR | 10-2014-0143912 A | 12/2014 |
| KR | 10-2015-0082816 A | 7/2015 |
| KR | 10-2016-0081655 A | 7/2016 |

\* cited by examiner

DISPLAY DEVICE

CROSS-REFERENCE TO RELATED APPLICATION

The present application claims priority to and the benefit of Korean Patent Application No. 10-2017-0139535, filed on Oct. 25, 2017, the content of which in its entirety is herein incorporated by reference.

BACKGROUND

1. Field

Aspects of some example embodiments of the present invention relate to a liquid crystal display device.

2. Description of the Related Art

A liquid crystal display device generally includes a display panel for displaying an image using a light transmittance of a liquid crystal and a backlight unit positioned under the display panel to provide light to the display panel. The backlight unit generally includes a light source that generates light required to display an image on the display panel.

A driving method of applying an inverted data voltage in a period (e.g., a predetermined period) may be utilized by the liquid crystal display device to prevent pixels of the display panel from being deteriorated.

The above information disclosed in this Background section is only for enhancement of understanding of the background of the invention and therefore it may contain information that does not constitute prior art.

SUMMARY

Aspects of some example embodiments of the present invention relate to a liquid crystal display device and, for example, to a liquid crystal display device capable of reducing occurrence of an afterimage by an image displayed for a long time.

Some example embodiments of the present invention may include a display device capable of reducing occurrence of an afterimage when a certain image is displayed for a long time in a certain portion of a display area.

Some example embodiments of the present invention may also include a display device capable of preventing or reducing instances of an afterimage occurring when a pattern, in which a black color and a white color are repeated, is displayed for a long time in a display area.

According to some example embodiments of the present invention, a display device may include a display panel, a data driver, a signal controller, and a common voltage generator.

The display panel may include a display area displaying an image, the display area may include a measurement area including a plurality of sub-measurement areas, and each of the plurality of sub-measurement areas may include a plurality of pre-map areas.

The data driver may provide data voltages to the display panel.

The signal controller may sequentially select the plurality of sub-measurement areas in response to a change in frame and may calculate first average values respectively corresponding to pre-map areas by using data voltages applied to the selected sub-measurement area at a first time point to generate first average value data. In addition, the signal controller may calculate second average values respectively corresponding to the pre-map areas by using data voltages applied to the selected sub-measurement area at a second time point after a predetermined time from the first time point to generate second average value data. Furthermore, the signal controller may compare the first average value data with the second average value data to determine pre-map areas, the first average values of which are equal to the second average values thereof, among the pre-map areas.

The common voltage generator may provide a common voltage to the display panel.

An afterimage reduction mode may be driven to change a level of the common voltage provided by the common voltage generator when the determined pre-map areas are adjacent to each other.

The display panel may include a liquid crystal layer, a plurality of pixel electrodes arranged to correspond to the liquid crystal layer and to which the data voltages are applied, and a common electrode arranged to correspond to the liquid crystal layer, which overlaps with the plurality of pixel electrodes, and to which the common voltage is applied.

The level of the common voltage may be reduced.

Each of the first average values and the second average values may be an average value of a red data signal value, a green data signal value and a blue data signal value.

A level of each of the data voltages may be reduced when the afterimage reduction mode is driven.

In an embodiment, the display device may further include a gamma voltage generator providing a plurality of gamma voltages to the data driver, and a level of each of the plurality of gamma voltages may be reduced when the afterimage reduction mode is driven.

In an embodiment, the measurement area may be adjacent to an edge of the display area.

In an embodiment, the measurement area may be provided in plurality. The plurality of measurement areas may include a first measurement area in a top left portion of the display area, a second measurement area in a top right portion of the display area, a third measurement area in a bottom left portion of the display area, and a fourth measurement area in a bottom right portion of the display area.

In an embodiment, the display device may further include a memory storing a first cumulative time for which the determined pre-map areas are adjacent to each other. The afterimage reduction mode may be driven when the first cumulative time is equal to or greater than a first time value.

In an embodiment, the memory may further store a second cumulative time for which the afterimage reduction mode is driven, and the level of the common voltage may be further reduced when a sum of the first cumulative time and the second cumulative time is equal to or greater than a second time value greater than the first time value.

In an embodiment, when the signal controller detects that the image includes a pattern in which a white color and a black color are repeated, a difference in level between the common voltage and a data voltage corresponding to the white color may be reduced.

In an aspect of the invention, a display device may include a display panel, a common voltage generator, and a data driver. The display panel may include a liquid crystal layer, a plurality of pixel electrodes arranged to correspond to the liquid crystal layer, and a common electrode arranged to correspond to the liquid crystal layer. A display area displaying an image may be defined in the display panel. The common voltage generator may provide a common voltage to the common electrode. The data driver may provide a data voltage inverted with reference to the common voltage to the plurality of pixel electrodes. A driving mode of the display device may include an afterimage reduction mode driven when the image includes a pattern in which a white color and a black color are repeated, and a normal mode driven when the image does not include the pattern. An absolute value of a difference between a level of the common voltage and a level of the data voltage for displaying the white color in the afterimage reduction mode may be smaller than an absolute value of a difference between a level of the common voltage and a level of the data voltage for displaying the white color in the normal mode.

In an embodiment, the level of the common voltage may be constant, and the level of the data voltage may be changed.

In an embodiment, the display device may further include a gamma voltage generator providing a gamma voltage corresponding to the data voltage to the data driver, and a level of the gamma voltage in the afterimage reduction mode may be smaller than a level of the gamma voltage in the normal mode.

In an embodiment, the display device may further include a signal controller providing a data signal corresponding to the data voltage to the data driver, and the signal controller may analyze the data signal to select one of the afterimage reduction mode and the normal mode.

BRIEF DESCRIPTION OF THE DRAWINGS

The above and other aspects and features of the present invention will become more apparent by describing in further detail aspects of some example embodiments thereof with reference to the accompanying drawings, in which.

DETAILED DESCRIPTION

Figure 1:
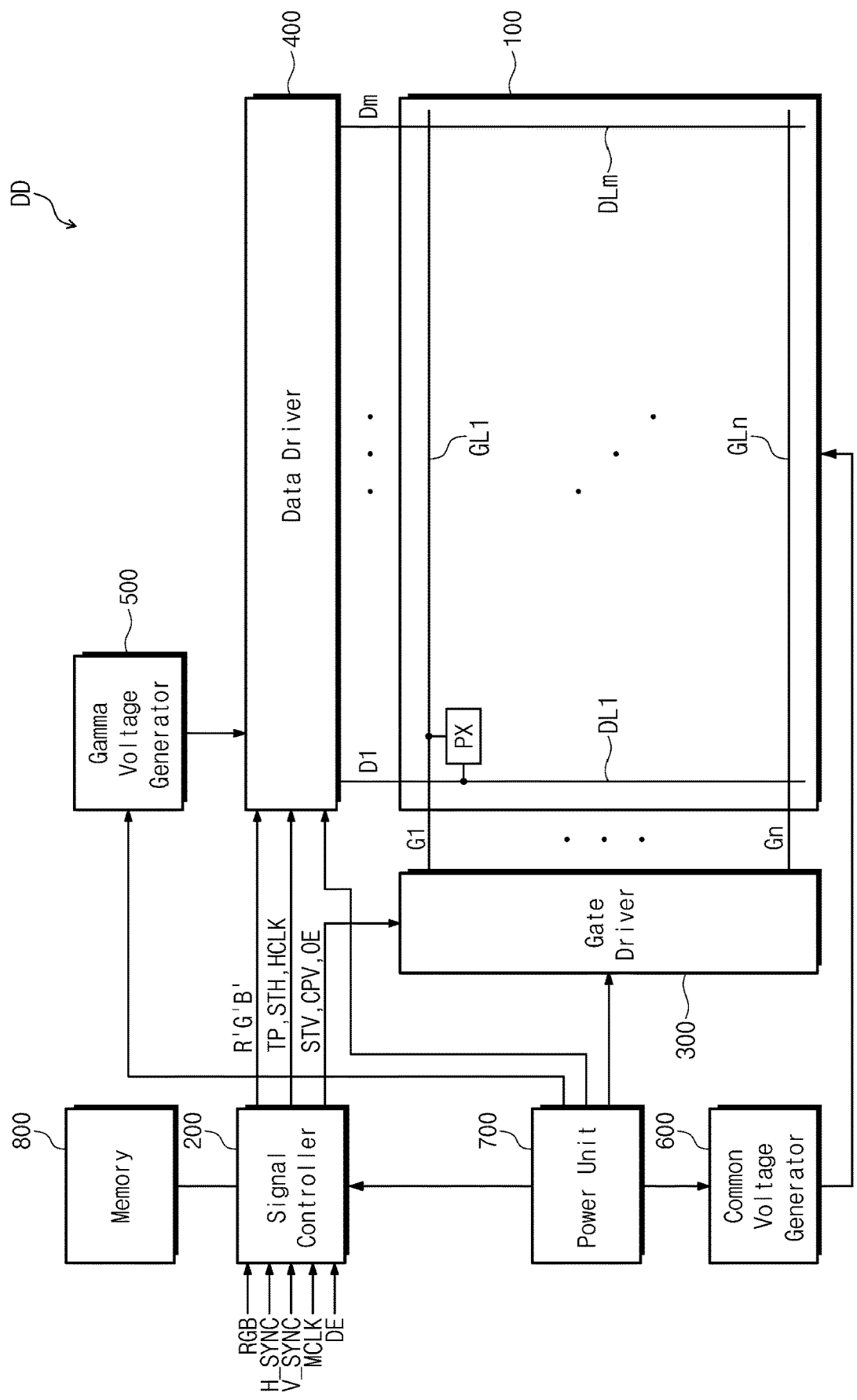
FIG. 1 is a block diagram illustrating a display device according to some example embodiments of the present invention.

Aspects of some example embodiments of the present invention will now be described more fully hereinafter with reference to the accompanying drawings, in which various embodiments are shown. The present invention may, however, be embodied in many different forms, and should not be construed as limited to the embodiments set forth herein. Rather, these embodiments are provided so that this disclosure will be more thorough and more complete, and will more-fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Aspects of some example embodiments are described herein with reference to cross-sectional illustrations and/or plane illustrations that are example illustrations. In the drawings, the thicknesses of layers and regions are exaggerated for clarity. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 2:
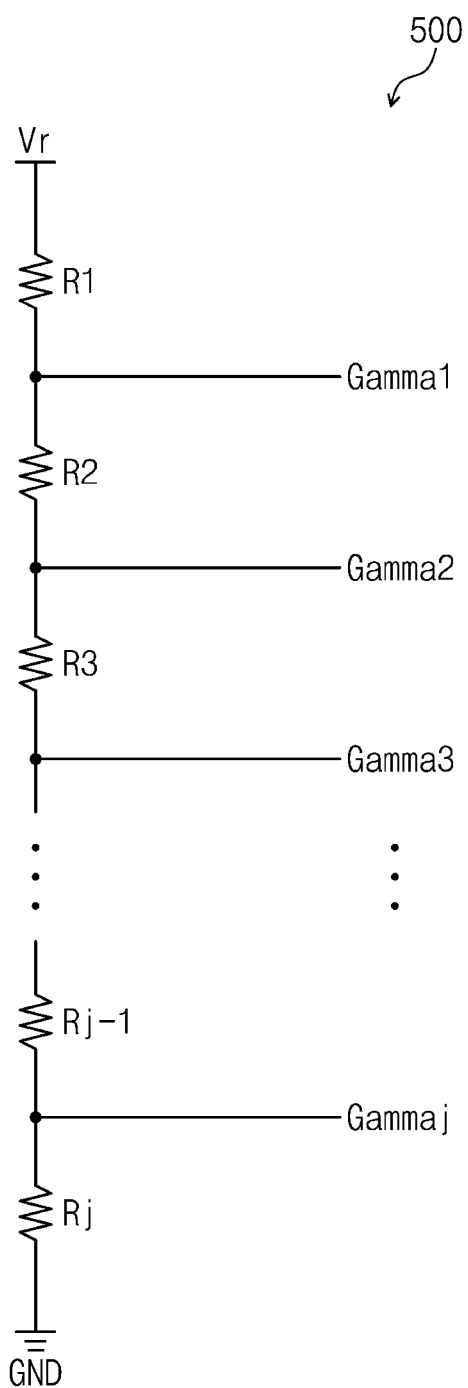
FIG. 2 is a circuit diagram of a gamma voltage generator illustrated in FIG. 1.
Figure 3:
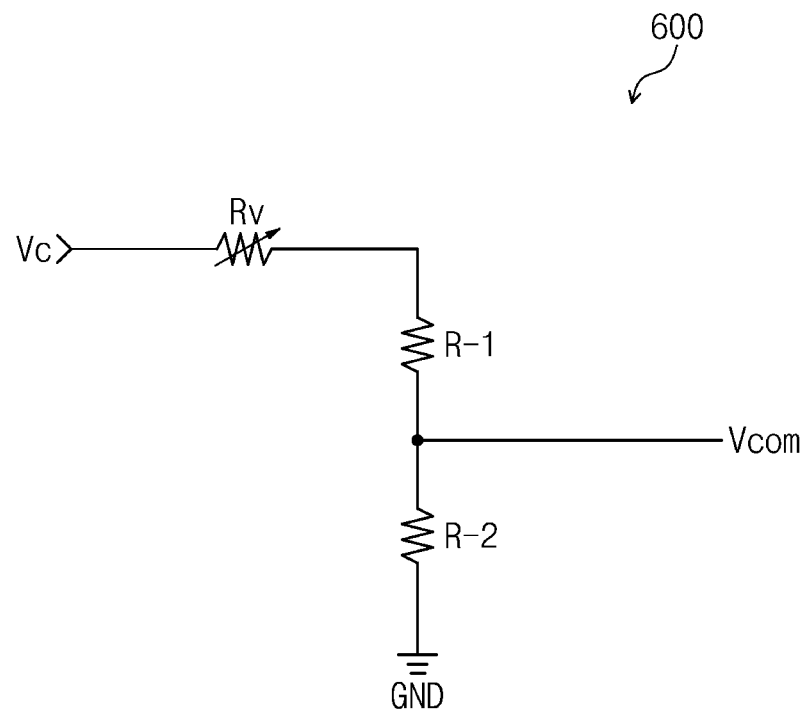
FIG. 3 is a circuit diagram of a common voltage generator illustrated in FIG. 1.

FIG. 1 is a block diagram illustrating a display device DD according to some example embodiments of the present invention. FIG. 2 is a circuit diagram of a gamma voltage generator 500 illustrated in FIG. 1. FIG. 3 is a circuit diagram of a common voltage generator 600 illustrated in FIG. 1.

Referring to FIG. 1, a display device DD according to some example embodiments of the present invention may include a display panel 100, a signal controller (or a timing controller) 200, a gate driver 300, a data driver 400, a gamma voltage generator 500, a common voltage generator 600, a power unit 700, and a memory 800.

The display panel 100 may include a plurality of gate lines GL1 to GLn, a plurality of data lines DL1 to DLm intersecting the gate lines GL1 to GLn, and a plurality of pixels PX. The plurality of gate lines GL1 to GLn may be connected to the gate driver 300. The plurality of data lines DL1 to DLm may be connected to the data driver 400. Some of the plurality of gate lines GL1 to GLn and some of the plurality of data lines DL1 to DLm are illustrated in FIG. 1 for the purpose of ease and convenience in illustration. In addition, the display panel 100 may further include a dummy gate line (not shown).

Each of the pixels PX may be connected to a corresponding one of the plurality of gate lines GL1 to GLn and a corresponding one of the plurality of data lines DL1 to DLm. One pixel PX connected to a first gate line GL1 and a first data line DL1 is illustrated in FIG. 1 for the purpose of ease and convenience in illustration.

The plurality of pixels PX may be classified into a plurality of groups on the basis of colors displayed by the pixels PX. Each of the pixels PX may display one of primary colors. The primary colors may include a red color, a green color, a blue color, and a white color. However, embodiments of the present invention are not limited thereto. In another embodiment, the primary colors may further include other various colors such as a yellow color, a cyan color, and a magenta color.

The signal controller 200 may receive image data signals RGB, a horizontal sync signal H_SYNC, a vertical sync signal V_SYNC, a clock signal MCLK, and a data enable signal DE from an external device. The signal controller 200 may convert a data format of the image data signals RGB into a data format corresponding to an interface between the data driver 400 and the signal controller 200. The signal controller 200 may provide the converted image data signals R'G'B' to the data driver 400. In addition, the signal controller 200 may output a data control signal (e.g., an output start signal TP, a horizontal start signal STH, and a clock signal HCLK) to the data driver 400. Furthermore, the signal controller 200 may output a gate control signal (e.g., a vertical start signal STV, a gate clock signal CPV, and an output enable signal OE) to the gate driver 300.

The gate driver 300 may receive a gate on voltage and a gate off voltage and may sequentially output gate signals G1 to Gn in response to the gate control signal STV, CPV and OE provided from the signal controller 200. The gate signals G1 to Gn may be sequentially provided to the gate lines GL1 to GLn of the display panel 100 to sequentially scan the gate lines GL1 to GLn. Even though not shown in the drawings, the display device DD may further include a regulator that converts an input voltage into the gate on voltage and the gate off voltage and outputs the gate on voltage and the gate off voltage.

The data driver 400 may generate a plurality of data voltages (or gray scale voltages) by using gamma voltages provided from the gamma voltage generator 500. When the data driver 400 receives the data control signal TP, STH and HCLK from the signal controller 200, the data driver 400 may select data voltages corresponding to the converted image data signals R'G'B' among the generated data voltages and may provide the selected data voltages as data signals D1 to Dm to the data lines DL1 to DLm of the display panel DR When the gate signals G1 to Gn are sequentially provided to the gate lines GL1 to GLn, the data signals D1 to Dm may be provided to the data lines DL1 to DLm in synchronization therewith.

Referring to FIG. 2, the gamma voltage generator 500 may generate gamma voltages Gamma1 to Gammaj having different voltage levels from each other by using a gamma voltage source Vr provided from the power unit 700. The gamma voltage generator 500 may provide the generated gamma voltages Gamma1 to Gammaj to the data driver 400. The gamma voltage generator 500 may include a plurality of gamma voltage dividing resistances R1 to Rj for dividing the gamma voltage source Vr.

Here, a gamma voltage Gamma1 outputted from an output terminal between a first gamma voltage dividing resistance R1 and a second gamma voltage dividing resistance R2 may have the highest voltage value, and a gamma voltage Gammaj outputted from an output terminal between a j-1$^{th}$ gamma voltage dividing resistance Rj-1 and a j$^{th}$ gamma voltage dividing resistance Rj may have the lowest voltage value.

In an embodiment of the invention, the gamma voltage generator 500 may be integrally formed with the data driver 400 as a single unitary unit, or the gamma voltage generator 500 may be included in the data driver 400.

Referring to FIG. 3, the common voltage generator 600 may generate a common voltage Vcom using a common voltage source Vc provided from the power unit 700 and may provide the generated common voltage Vcom to the display panel 100. As illustrated in. FIG. 3, the common voltage generator 600 may include resistances R-1 and R-2 for dividing a voltage of the common voltage source Vc provided from the power unit 700, and a variable resistance Rv. The common voltage Vcom may be outputted from an output terminal between the resistances R-1 and R-2. The common voltage Vcom may be adjusted by adjusting a resistance value of the variable resistance Rv.

In some example embodiments of the present invention, the common voltage generator 600 may be integrally formed with a power unit 700 as a single unitary unit, or the common voltage generator 600 may be included in the power unit 700.

Information on voltage values of signals exchanged between the components 100, 200, 300, 400, 500, 600 and 700 in the display device DD may be stored in the memory 800. The memory 800 may be provided as a separate component or may be included in at least one of the components 100, 200, 300, 400, 500, 600 and 700.

Figure 4:
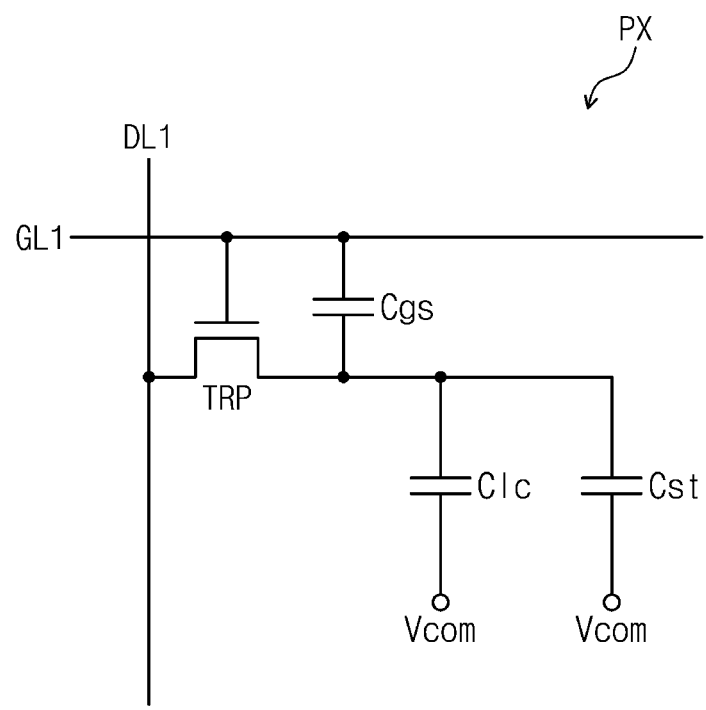
FIG. 4 is an equivalent circuit diagram of a pixel according to some example embodiments of the present invention.
Figure 5:
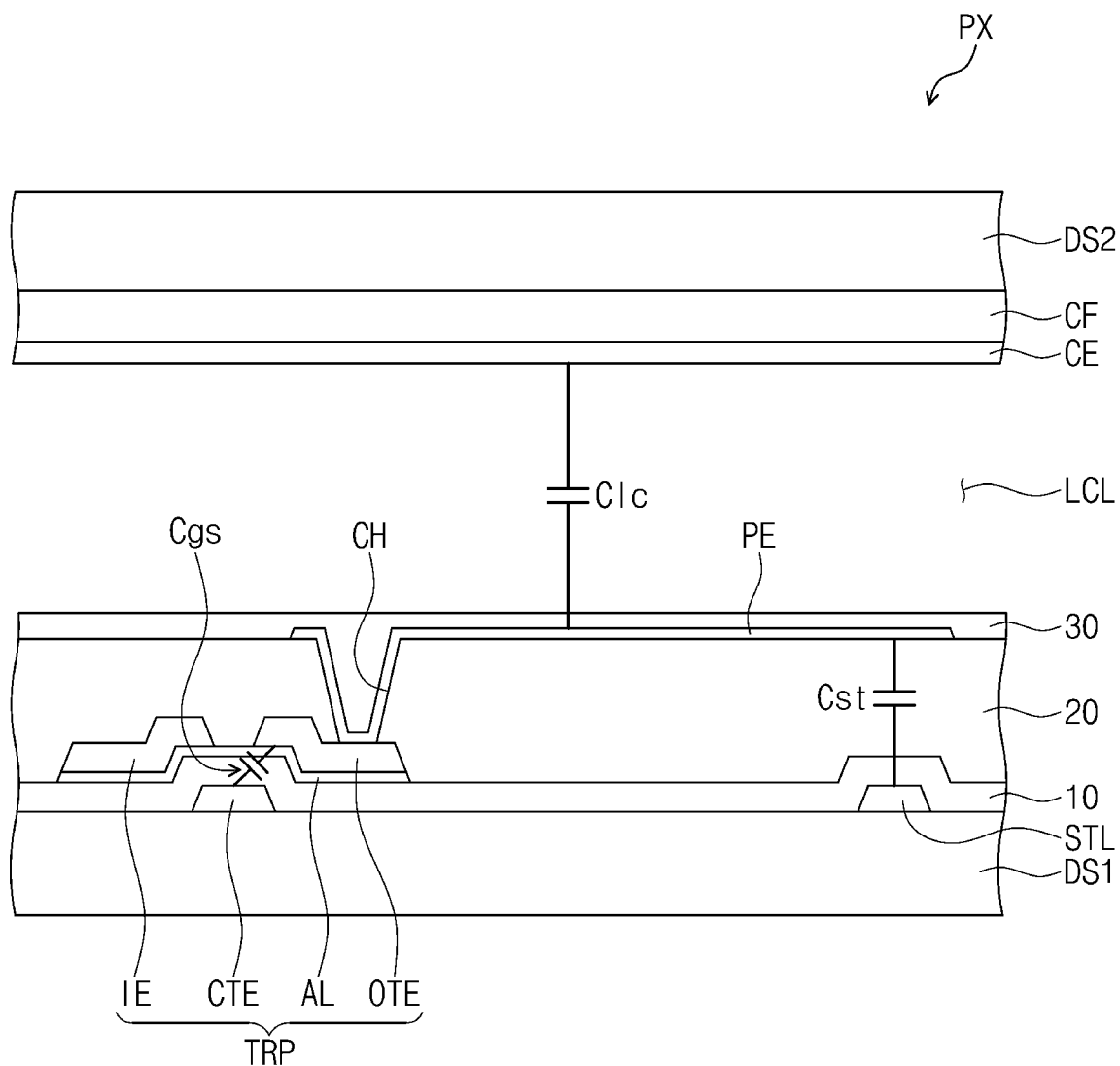
FIG. 5 is a cross-sectional view illustrating a pixel according to an embodiment of the invention.

FIG. 4 is an equivalent circuit diagram of a pixel PX according to some example embodiments of the present invention. FIG. 5 is a cross-sectional view illustrating a pixel PX according to some example embodiments of the present invention.

As illustrated in FIG. 4, a pixel PX may include a pixel thin film transistor TRP (hereinafter, referred to as 'a pixel transistor TRP'), a liquid crystal capacitor Clc, and a storage capacitor Cst. In addition, the pixel PX may further include a parasitic capacitor Cgs.

In the present specification, a transistor used herein refers to a thin film transistor. In an embodiment of the invention, the storage capacitor Cst may be omitted.

The pixel transistor TRP electrically connected to the first gate line GL1 and the first data line DL1 is illustrated as an example in FIGS. 4 and 5.

The pixel transistor TRP may output a pixel voltage corresponding to a data signal received from the first data line DL1 in response to a gate signal received from the first gate line GL1.

The liquid crystal capacitor Clc may store the pixel voltage outputted from the pixel transistor TRP. Arrangement of liquid crystal directors included in a liquid crystal layer LCL (see FIG. 5) may be changed depending on the amount of charges stored in the liquid crystal capacitor Clc. Light incident to the liquid crystal layer LCL may be transmitted or blocked according to the arrangement of the liquid crystal directors.

The storage capacitor Cst may be connected in parallel to the liquid crystal capacitor Clc. The storage capacitor Cst may maintain the arrangement of the liquid crystal directors for a certain period.

As illustrated in FIG. 5, the pixel transistor TRP may include a control electrode CTE connected to the first gate line GL1 (see FIG. 4), an active layer AL overlapping with the control electrode CTE, an input electrode IE connected to the first data line DL1 (see FIG. 4), and an output electrode OTE spaced apart from the input electrode IE.

The liquid crystal capacitor Clc may include a pixel electrode PE and a common electrode CE. The storage capacitor Cst may include the pixel electrode PE and a portion of a storage line STL overlapping with the pixel electrode PE. The common voltage Vcom (see FIG. 3) may be applied to the common electrode CE, and the data signal D1 (see FIG. 1) may be applied to the pixel electrode PE.

The first gate line GL1 and the storage line STL may be arranged on one surface of a first substrate DS1. The control electrode CTE may be branched from the first gate line GL1. The first gate line GL1 and the storage line STL may include a metal (e.g., aluminum (Al), silver (Ag), copper (Cu), molybdenum (Mo), chromium (Cr), tantalum (Ta), or titanium (Ti)) or any alloy thereof. In an embodiment, the first gate line GL1 and the storage line STL may have a multi-layered structure (e.g., a titanium layer and a copper layer).

A first insulating layer 10 may be arranged on the one surface of the first substrate DS1 and may cover the control electrode CTE and the storage line STL. The first insulating layer 10 may include at least one of an inorganic material or an organic material. The first insulating layer 10 may be an organic layer or an inorganic layer. In some example embodiments, the first insulating layer 10 may include a multi-layered structure (e.g., a silicon nitride layer and a silicon oxide layer).

The active layer AL overlapping with the control electrode CTE may be arranged on the first insulating layer 10. The active layer AL may include a semiconductor layer and an ohmic contact layer.

The active layer AL may include amorphous silicon or poly-silicon. Alternatively, the active layer AL may include a metal oxide semiconductor.

The output electrode OTE and the input electrode IE may be arranged on the active layer AL. The output electrode OTE and the input electrode IE may be spaced apart from each other. Each of the output electrode OTE and the input electrode IE may partially overlap with the control electrode CTE.

The pixel transistor TRP having a staggered structure is illustrated as an example in FIG. 5. However, the structure of the pixel transistor TRP is not limited thereto. In another embodiment, the pixel transistor TRP may have a planar structure.

A second insulating layer 20 may be positioned on the first insulating layer 10 and may cover the active layer AL, the output electrode OTE, and the input electrode IE. The second insulating layer 20 may provide a flat surface (e.g., a flat top surface). The second insulating layer 20 may include an organic material.

The pixel electrode PE may be arranged on the second insulating layer 20. The pixel electrode PE may be connected to the output electrode OTE through a contact hole CH penetrating the second insulating layer 20. An alignment layer 30 covering the pixel electrode PE may be arranged on the second insulating layer 20.

A color filter layer CF may be arranged on one surface of a second substrate DS2. The common electrode CE may be arranged on one surface of the color filter layer CF. The common voltage may be applied to the common electrode CE. A value of the common voltage may be different from that of a pixel voltage (i.e., the data signal D1). An alignment layer (not shown) covering the common electrode CE may be arranged on one surface of the common electrode CE. An additional insulating layer may be arranged between the color filter layer CF and the common electrode CE.

The pixel electrode PE and the common electrode CE arranged with the liquid crystal layer LCL interposed therebetween may form the liquid crystal capacitor Clc. In addition, the pixel electrode PE and the storage line STL arranged with the first and second insulating layers 10 and 20 interposed therebetween may form the storage capacitor Cst. The storage line STL may receive a storage voltage of which a value is different from that of the pixel voltage. The value of the storage voltage may be equal to the value of the common voltage.

However, the cross section of the pixel PX of FIG. 5 is illustrated as an example of the present invention. In another embodiment, unlike FIG. 5, at least one of the color filter layer CF or the common electrode CE may be arranged on the first substrate DS1. In other embodiments of the invention, the display panel may include a pixel of a vertical alignment (VA) mode, a patterned vertical alignment (PVA) mode, an in-plane switching (IPS) mode, a fringe-field switching (FFS) mode or a plane-to-line switching (PLS) mode.

The parasitic capacitor Cgs may be formed by the output electrode OTE and the gate line (e.g., the first gate line GL1). Alternatively, because the first gate line GL1 is connected to the control electrode CTE, the parasitic capacitor Cgs may be formed by the output electrode OTE and the control electrode CTE.

When the display panel 100 (see FIG. 1) is driven for a long time, characteristics of the pixel transistor TRP may be changed, and thus a capacitance of the parasitic capacitor Cgs may increase. Therefore, a kickback voltage may be increased to change an optimal common voltage Vcom (see FIG. 3) for driving the display panel 100.

In an inversion driving method for reducing deterioration of a liquid crystal, polarities of the data signals D1 to Dm may be inverted between adjacent liquid crystal cells or a polarity of the data signals D1 to Dm may be inverted in a period of time (e.g., a predetermined period of time, e.g., in the unit of a frame). Here, the inversion of the polarity may mean that the data signals D1 to Dm swing symmetrically with reference to the common voltage Vcom (see FIG. 3). Thus, the change of the common voltage Vcom may mean that a reference on which the data signals D1 to Dm swing is changed. When the reference on which the data signals D1 to Dm swing is changed, the voltage stored in the liquid crystal capacitor Clc may be unbalanced to cause an afterimage on the display device DD.

Therefore, to prevent occurrence of the afterimage, the common voltage Vcom may be changed (see FIG. 3) depending on a time for which the display device DD is driven.

Figure 6:
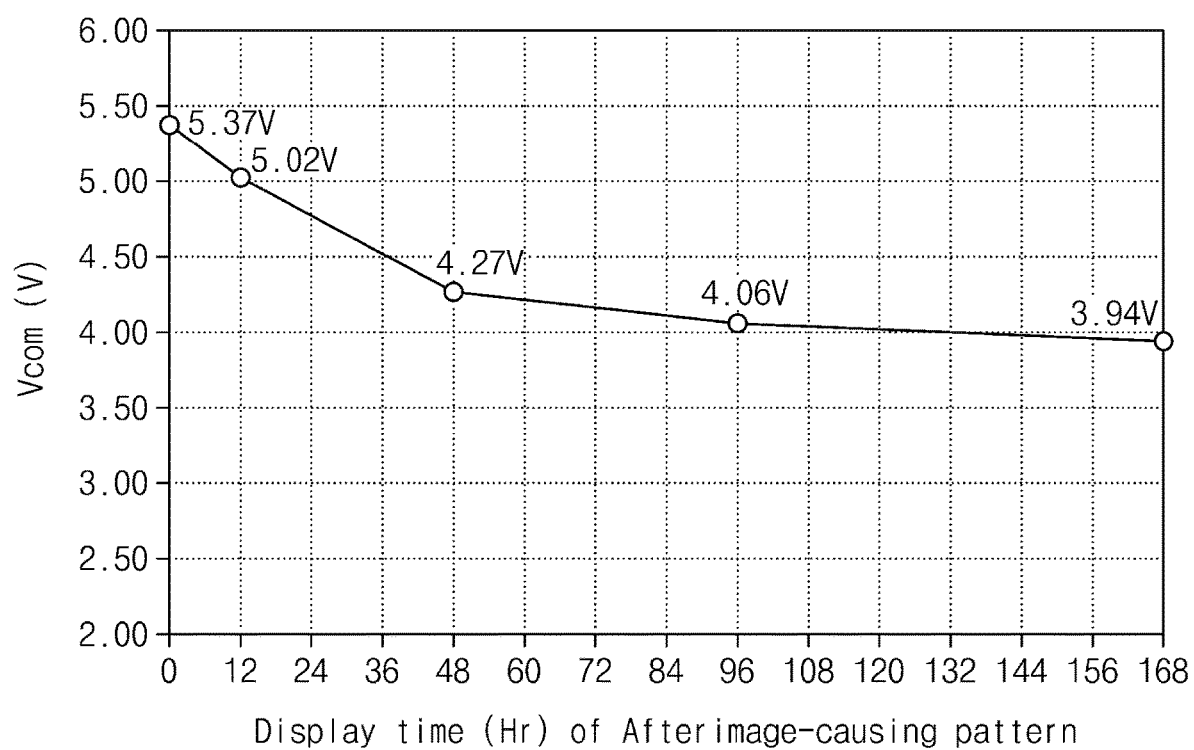
FIG. 6 is a graph illustrating a change in common voltage according to a display time of an afterimage-causing pattern.

FIG. 6 is a graph illustrating a change in common voltage Vcom according to a display time of an afterimage-causing pattern.

An afterimage of the display device DD may occur more frequently when an afterimage-causing pattern is displayed for a long time than when a normal image is displayed. In the present specification, the afterimage-causing pattern may mean an image which is continuously displayed at the same position without being changed.

The display device DD according to some example embodiments of the present invention may cumulatively store a display time of the afterimage-causing pattern and may lower or reduce the common voltage Vcom depending on the cumulatively stored time.

In FIG. 6, an initial value of the common voltage Vcom is 5.37V, the common voltage Vcom is 5.02V when the cumulative time is 12 hours, and the common voltage Vcom is 4.27V when the cumulative time is 48 hours.

Levels of the common voltages Vcom corresponding to all times are not stored in the memory 800 (see FIG. 1). Thus, the memory 800 may store levels of the common voltages Vcom corresponding to some times, such as an initial common voltage level, a common voltage level in a case of 12 hours, a common voltage level in a case of 48 hours, a common voltage level in a case of 96 hours, and a common voltage level in a case of 168 hours, as shown in FIG. 6. In addition, levels of the common voltages corresponding to other times may be calculated using interpolation.

Figure 7:
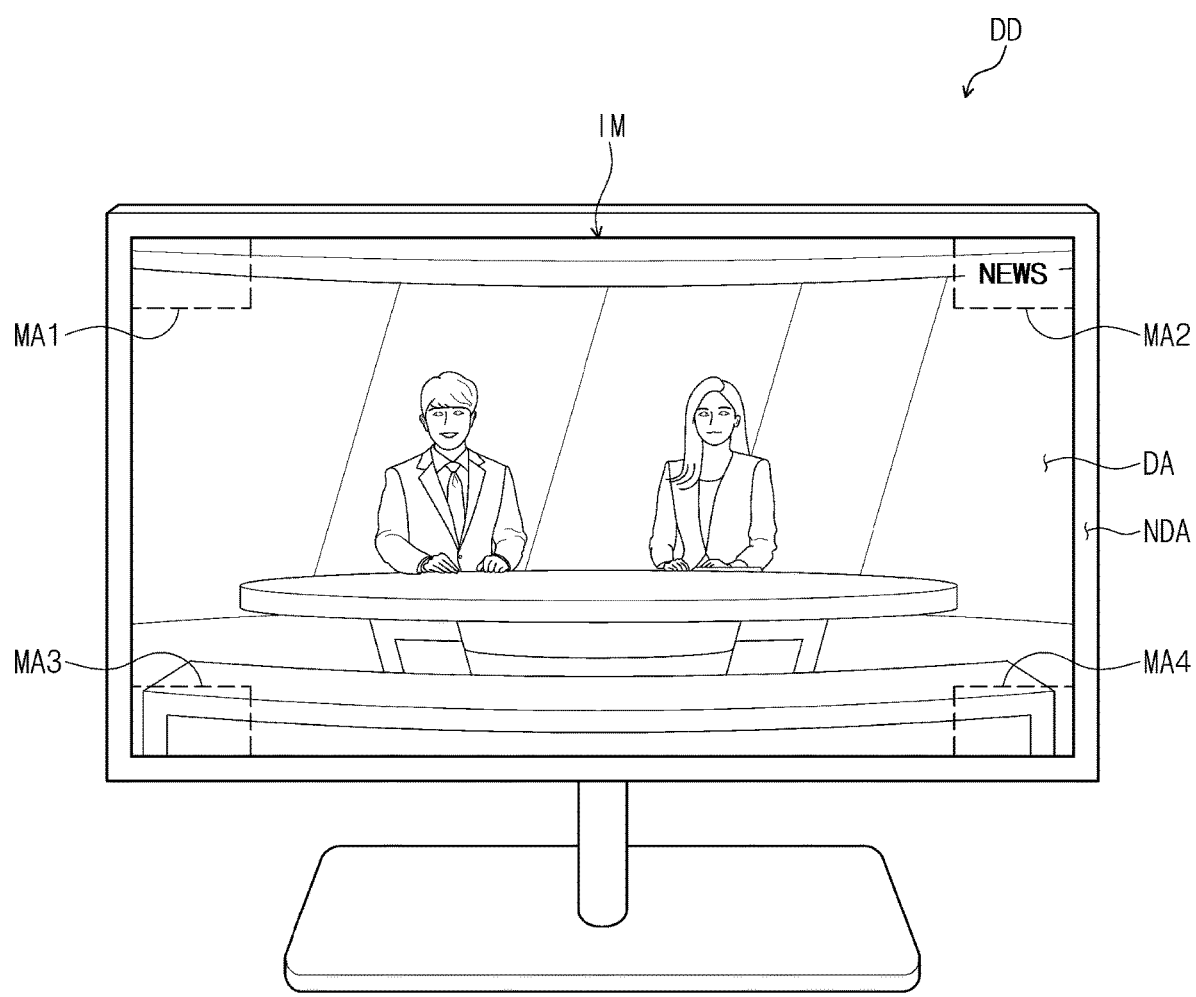
FIG. 7 is a view illustrating a display device on which an image including an afterimage-causing pattern is displayed.
Figure 8:
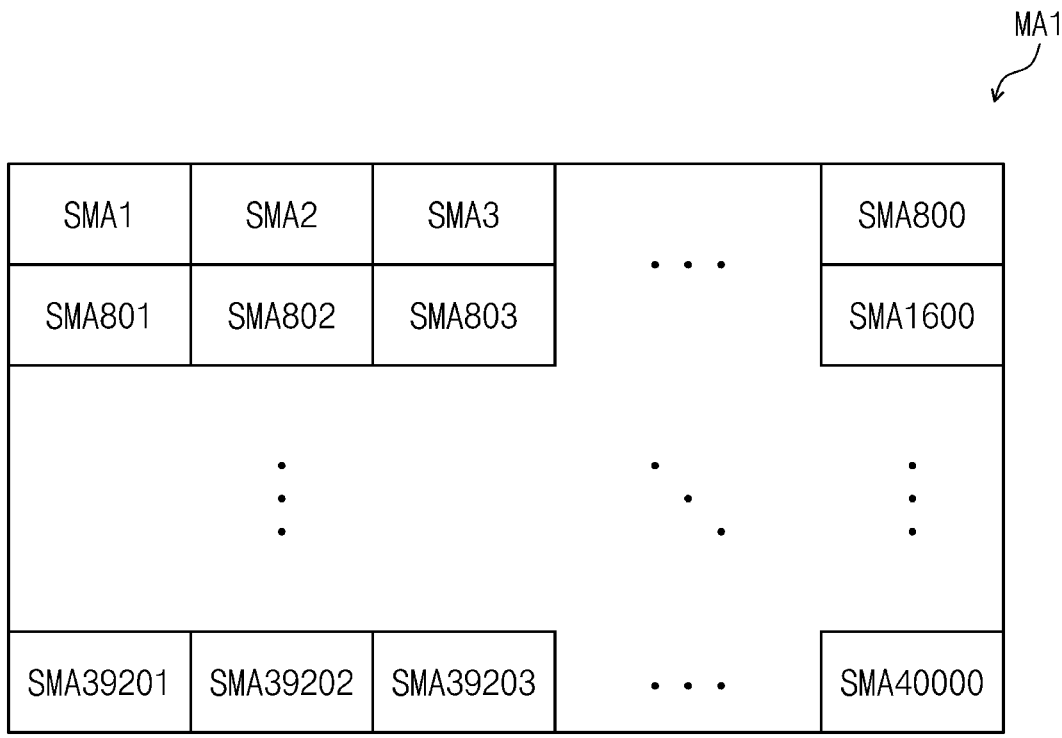
FIG. 8 is a view illustrating one of measurement areas of FIG. 7.
Figure 9:
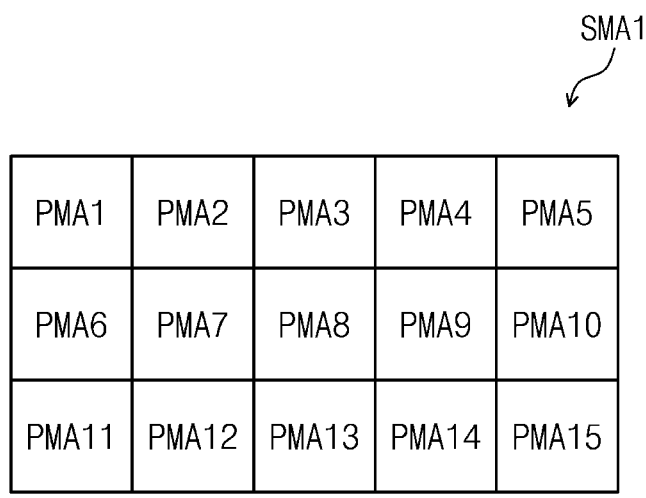
FIG. 9 is a view illustrating one of sub-measurement areas of FIG. 8.

FIG. 7 is a view illustrating a display device DD on which an image IM including an afterimage-causing pattern is displayed. FIG. 8 is a view illustrating one of measurement areas MA1 to MA4 of FIG. 7. FIG. 9 is a view illustrating one of sub-measurement areas SMA1 to SMA40000 of FIG. 8.

The display device DD may include a display area DA in which an image IM is displayed, and a non-display area NDA which is arranged around the display area DA. The pixels PX (see FIG. 1) may be arranged in the display area DA.

The display area DA may include a plurality of measurement areas MA1, MA2, MA3 and MA4 for detecting the afterimage-causing pattern. In an embodiment of the invention, the display device DD may not detect whether the afterimage-causing pattern is displayed in an entire display area DA or not but may detect whether the afterimage-causing pattern is displayed in the measurement areas MA1 to MA4 or not.

A first measurement area MA1 may be arranged in a top left portion of the display area DA, and a second measurement area MA2 may be arranged in a top right portion of the display area DA. A third measurement area MA3 may be arranged in a bottom left portion of the display area DA, and a fourth measurement area MA4 may be arranged in a bottom right portion of the display area DA. However, the number and positions of the measurement areas are not limited thereto but may be variously modified.

The afterimage-causing pattern may mean the image which is continuously displayed at the same position without being changed, as described above, and a news image is illustrated as an example of the image IM including the afterimage-causing pattern in FIG. 7.

In the news image, a specific word (or letter(s)) such as a broadcaster logo may be continuously displayed as the afterimage-causing pattern in a top left portion or a top right portion. FIG. 7 illustrates a word 'NEWS' positioned as the specific word in the second measurement area MA2.

The display device DD may measure a cumulative time for which the afterimage-causing pattern is displayed, and the display device DD may store information corresponding to the cumulative time in the memory 800 (see FIG. 1). The change in the common voltage Vcom according to the cumulative time, which is stored in the memory 800, may be the same as described above.

Algorithm detecting the afterimage-causing pattern will be described with reference to the first measurement area MA1 through FIGS. 8 and 9. Descriptions to other measurement areas MA2 to MA4 may be substantially the same as descriptions to the first measurement area MA1.

In some example embodiments of the present invention, the algorithm detecting the afterimage-causing pattern may be performed by the signal controller 200 of the display device DD. However, embodiments of the present invention are not limited thereto.

Referring to FIG. 8, the first measurement area MA1 may include a plurality of sub-measurement areas SMA1 to SMA40000. The first measurement area MA1 including 40,000 sub-measurement areas SMA1 to SMA40000 is illustrated as an example in FIG. 8. However, embodiments of the invention are not limited thereto.

The display device DD may sequentially select the sub-measurement areas SMA1 to SMA40000 respectively corresponding to frames and may analyze an image of the selected sub-measurement area. For example, a first sub-measurement area SMA1 may be selected in a first frame, a second sub-measurement area SMA2 may be selected in a second frame, and a third sub-measurement area SMA3 may be selected in a third frame.

In another embodiment of the invention, the display device DD may sequentially select the sub-measurement areas SMA1 to SMA40000 at intervals of a plurality of frames.

The first sub-measurement area SMA1 will be described with reference to FIG. 9. Descriptions to other sub-measurement areas SMA2 to SMA40000 may be substantially the same as descriptions to the first sub-measurement area SMA1.

The first sub-measurement area SMA1 may include a plurality of pre-map areas PMA1 to PMA15. The first sub-measurement area SMA1 including fifteen pre-map areas PMA1 to PMA15 is illustrated as an example in FIG. 9. However, embodiments of the present invention are not limited thereto.

The display device DD may calculate respective average values of the pre-map areas PMA1 to PMA15. Because the average value of each of the fifteen pre-map areas PMA1 to PMA15 is calculated, fifteen average values may be calculated and average value data may be generated by the calculated average values. In other words, the average value data may include the average values calculated from the pre-map areas PMA1 to PMA15, respectively. In some example embodiments of the present invention, each of the average values may be an average value of a red data signal value, a green data signal value and a blue data signal value.

First average value data may be generated by average values (hereinafter, referred to as 'first average values')

which are calculated respectively from the pre-map areas PMA1 to PMA15 at a first time point. Second average value data may be generated by average values (hereinafter, referred to as 'second average values') which are calculated respectively from the pre-map areas PMA1 to PMA15 at a second time point after a predetermined time from the first time point.

The display device DD may compare the first average values of the first average value data with the second average values of the second average value data to determine whether pre-map areas where there is no change in the average value during the predetermined time exist among the pre-map areas PMA1 to PMA15 or, not.

When the pre-map areas where there is no change in the average value are arranged adjacent to each other, the display device DD may drive an afterimage reduction mode to change a level of the common voltage Vcom like FIG. 6.

Figure 10:
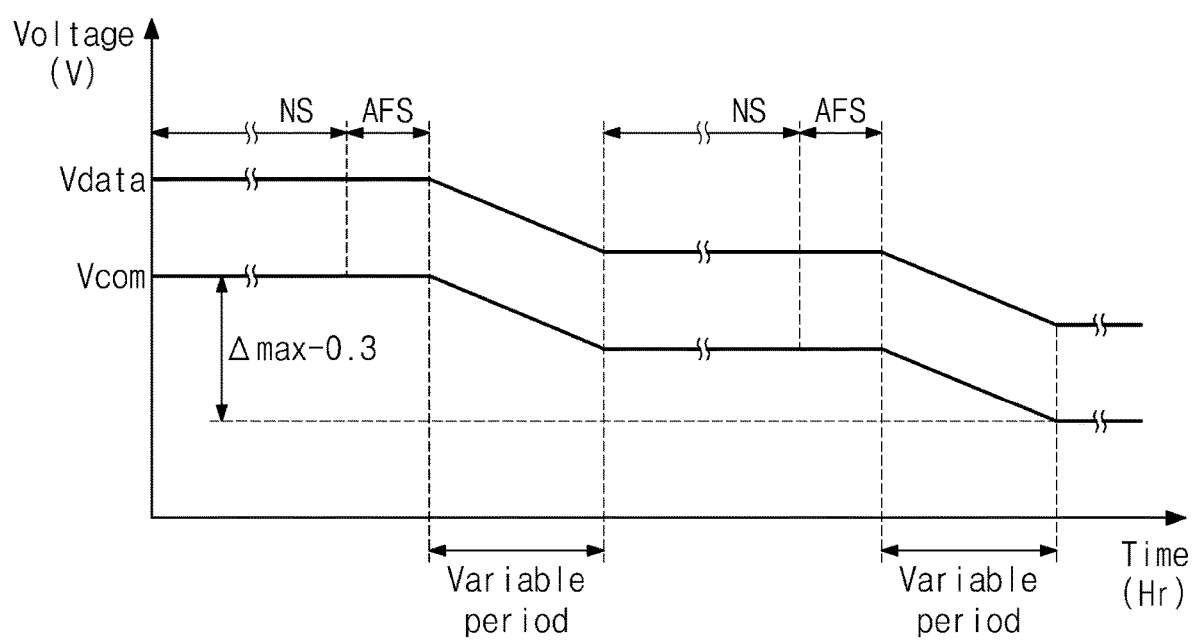
FIG. 10 is a graph illustrating changes in common voltage and data voltage when an afterimage reduction mode is performed in a display device according to some example embodiments of the present invention.

FIG. 10 is a graph illustrating changes in common voltage Vcom and data voltage Vdata when an afterimage reduction mode is performed or driven in a display device DD according to some example embodiments of the present invention.

Referring to FIGS. 7 and 10, the common voltage Vcom may not be changed in a normal period NS in which the image IM does not include the afterimage-causing pattern. In an afterimage-causing pattern display period AFS in which the image IM includes the afterimage-causing pattern, the display device DD may detect whether the afterimage-causing pattern occurs or not through the algorithm described with reference to FIGS. 7 to 9. When the display device DD determines that the afterimage-causing pattern has been displayed for a long period of time, the level of the common voltage Vcom may be lowered or reduced during a variable period.

The data voltage Vdata may correspond to the data signal D1 to Dm. A level of the data voltage Vdata may also be changed in response to the change in the level of the common voltage Vcom. This may be because a difference in level between voltages applied to the common electrode CE and the pixel electrode PE of the liquid crystal capacitor Clc (see FIG. 5) is uniformly maintained so that a change in image quality is not viewed to users.

In an embodiment of the invention, the level of the data voltage Vdata may be changed due to changes in level of the gamma voltages Gamma1 to Gammaj. In other words, when the occurrence of the afterimage-causing pattern is detected, the levels of the gamma voltages Gamma1 to Gammaj may be changed, and thus the level of the data voltage Vdata may be changed.

In an embodiment of the invention, the level of the common voltage Vcom may be lowered by a maximum of 0.3V during the afterimage reduction mode. This may be because a change in image quality may be viewed to users by a change in gamma curve if the level of the common voltage Vcom is lowered by a value greater than 0.3V.

Figure 11:
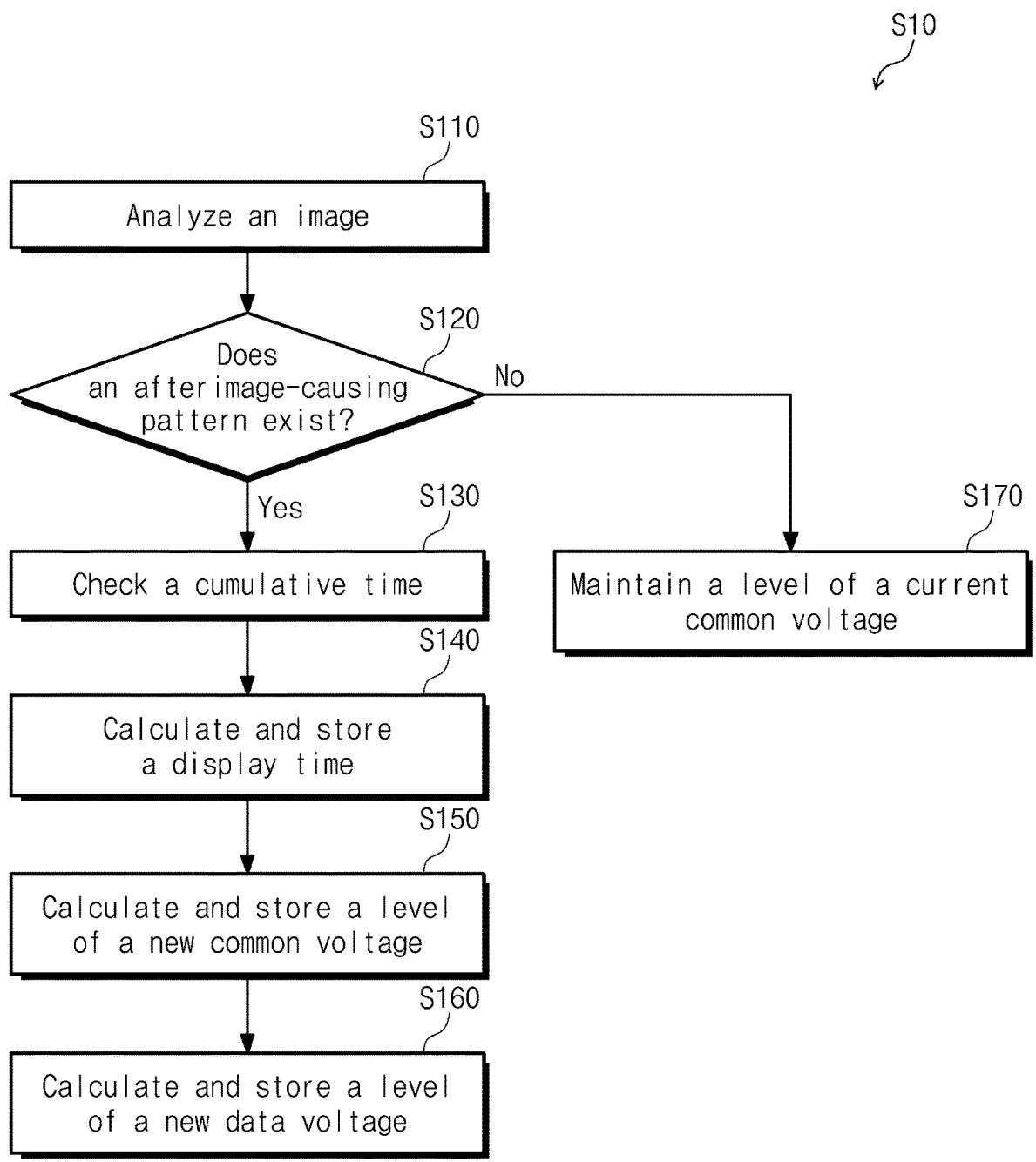
FIG. 11 is a flowchart illustrating a process in which an afterimage reduction mode is performed.

FIG. 11 is a flowchart S10 illustrating a process in which an afterimage reduction mode is performed.

In an operation S110 of analyzing an image and an operation S120 of detecting an afterimage-causing pattern, it is possible to analyze and detect whether the image IM includes the afterimage-causing pattern or not by using the algorithm described with reference to FIGS. 7 to 9.

When the image IM does not include the afterimage-causing pattern, the display device DD may perform an operation S170 of maintaining a current common voltage.

When the image IM includes the afterimage-causing pattern, the display device DD may check a past cumulative time value which is a sum of times in which the afterimage-causing pattern has occurred up to now, in an operation S130 of checking a cumulative time.

In addition, in an operation S140 of calculating and storing a display time, the display device DD may calculate a duration time of a currently displayed afterimage-causing pattern and may store the calculated duration time value. The order of the operation S130 of checking the cumulative time and the operation S140 of calculating and storing the display time may be changed, and a total cumulative time value may be calculated by summing the past cumulative time value and the calculated duration time value in one of the operations S130 and S140.

In an operation S150 of calculating and storing a level of a common voltage, a level of a new common voltage may be calculated using the calculated total cumulative time value and the calculated level of the new common voltage may be stored in the memory 800 (see FIG. 1).

In addition, in an operation S160 of calculating and storing a level of a data voltage, a level of a new data voltage may be calculated using the calculated total cumulative time value and the calculated level of the new data voltage may be stored in the memory 800 (see FIG. 1).

Figure 12:
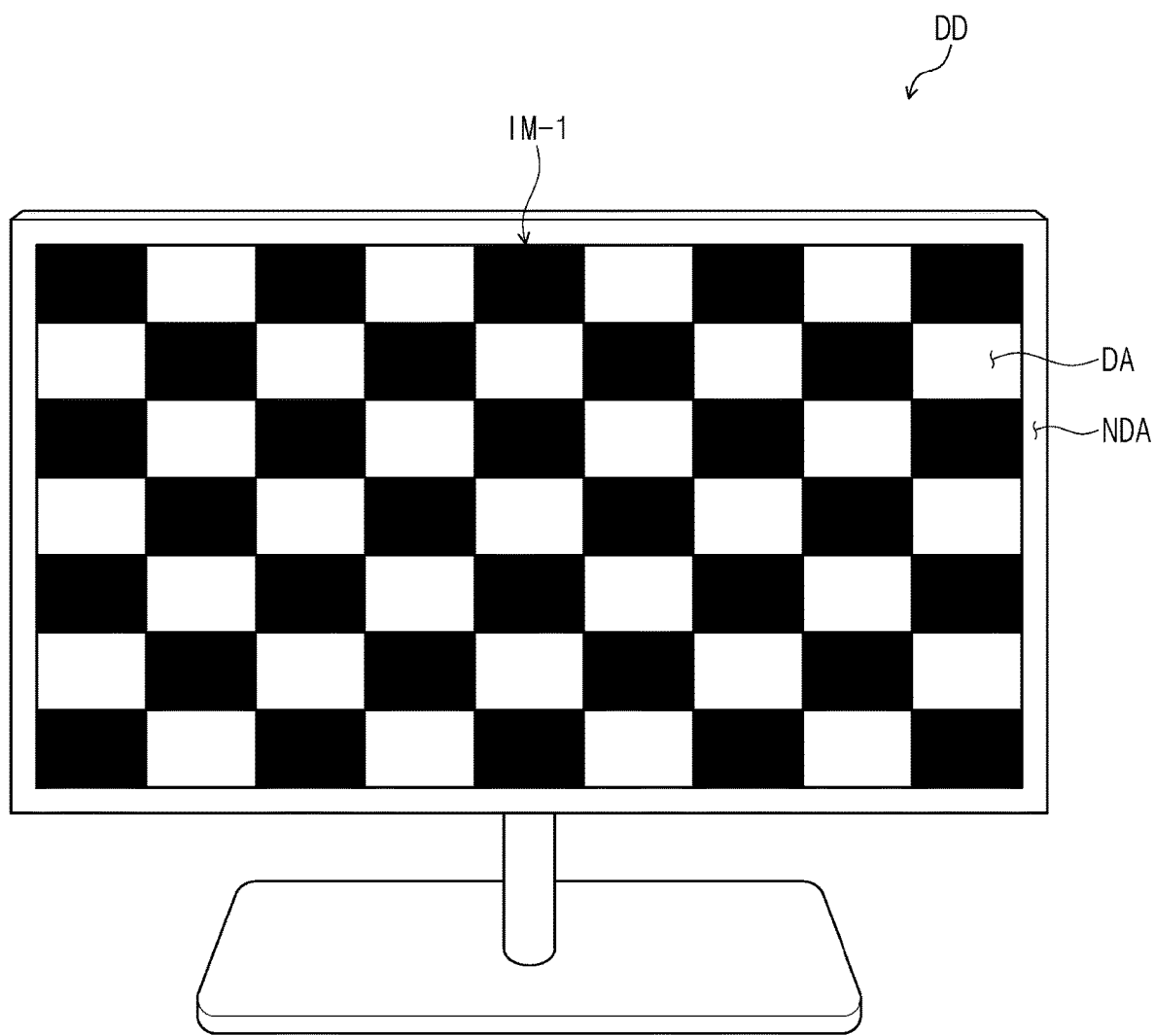
FIG. 12 is a view illustrating a display device on which an image including an afterimage-causing pattern is displayed.
Figure 13:
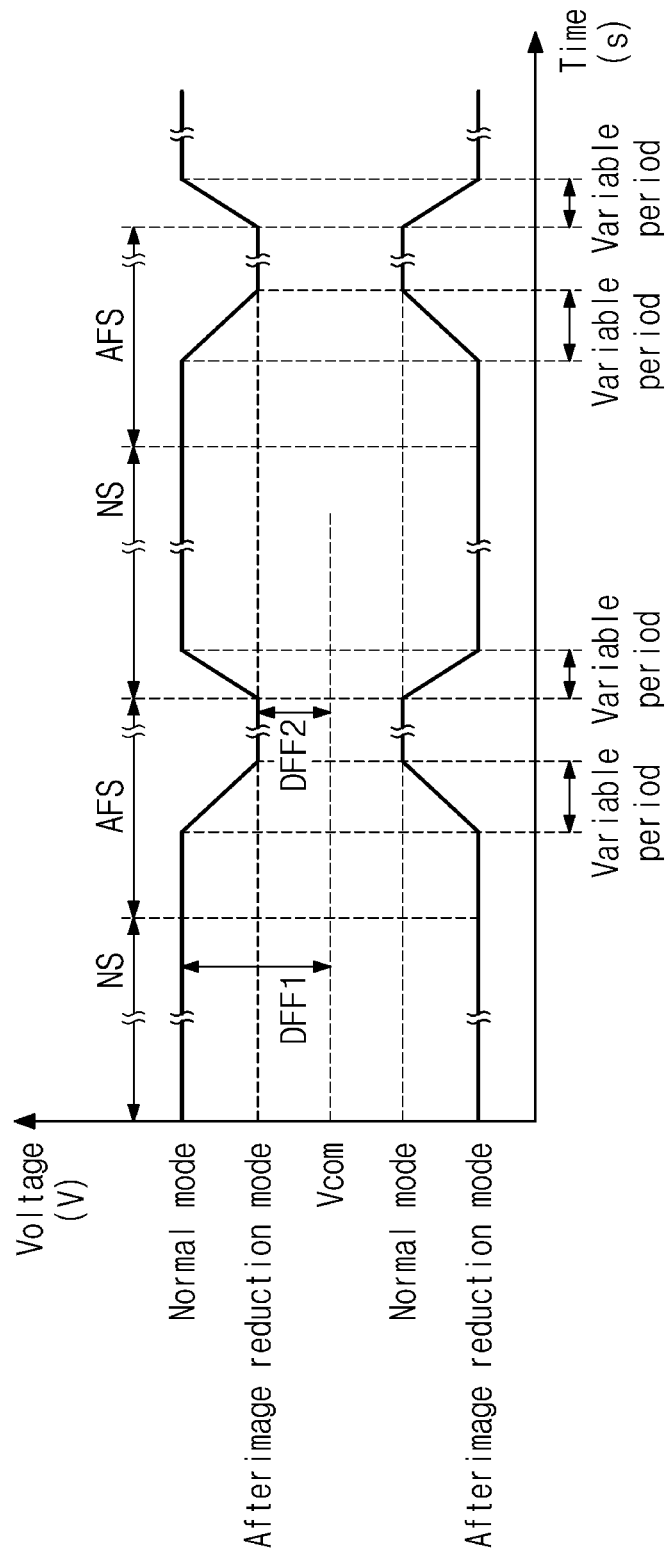
FIG. 13 is a graph illustrating a change in data voltage when a display device according to an embodiment of the invention is driven in an afterimage reduction mode or a normal mode.
Figure 14:
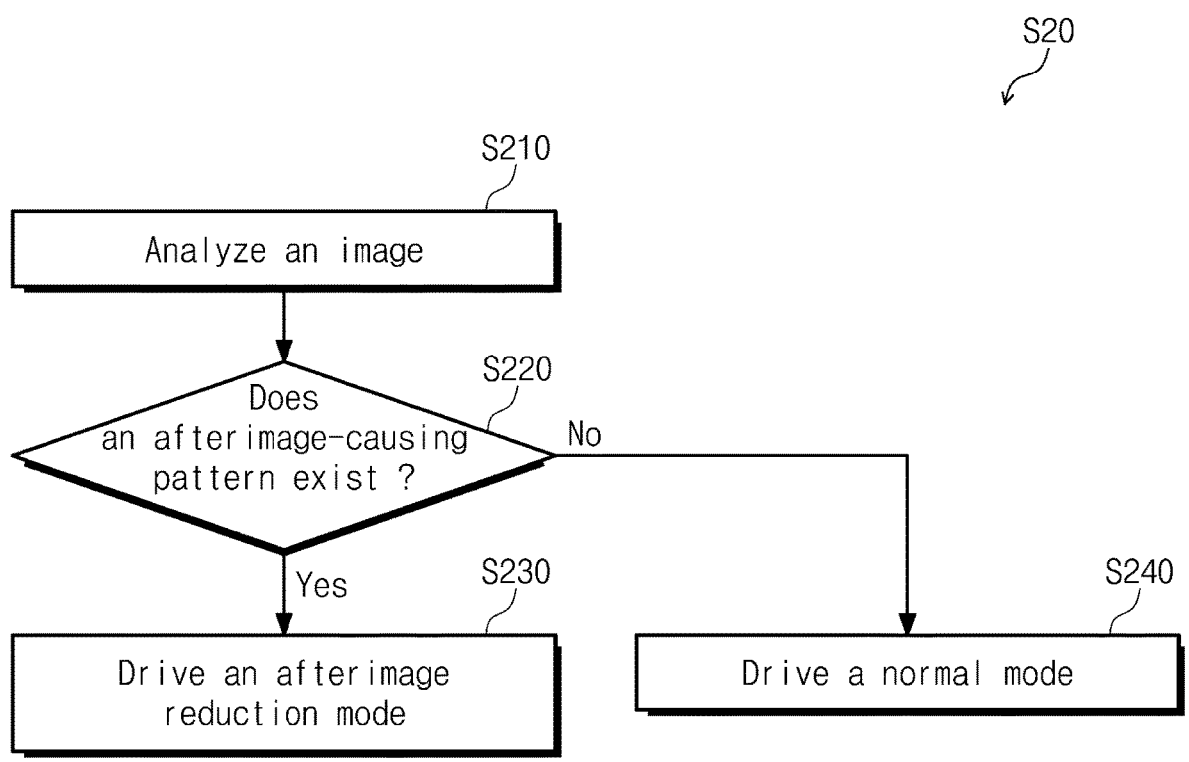
FIG. 14 is a flowchart illustrating a process in which a display device selects a driving mode.

FIG. 12 is a view illustrating a display device DD on which an afterimage-causing image IM-1 including an afterimage-causing pattern is displayed. FIG. 13 is a graph illustrating a change in data voltage when a display device DD according to an embodiment of the invention is driven in an afterimage reduction mode or a normal mode. FIG. 14 is a flowchart S20 illustrating a process in which a display device DD selects a driving mode.

A pattern in which a white color and a black color are repeated is illustrated as an example of the afterimage-causing pattern in FIG. 12.

A driving mode of the display device DD may include an afterimage reduction mode and a normal mode. The afterimage reduction mode may be driven when the display device DD detects that an afterimage-causing image IM-1 is displayed, and the normal mode may be driven when the display device DD detects that the afterimage-causing image IM-1 is not displayed.

A difference DFF2 in level between a data voltage and a common voltage Vcom which are applied for displaying the white color in the afterimage reduction mode may be smaller than a difference DFF1 in level between a data voltage and a common voltage Vcom which are applied for displaying the white color in the normal mode. For example, the level of the common voltage Vcom may be constant but the level of the data voltage may be changed.

In some example embodiments of the present invention, the level of the data voltage may be changed due to changes in level of the gamma voltages Gamma1 to Gammaj. In other words, in the afterimage reduction mode, the levels of the gamma voltages Gamma1 to Gammaj may be changed, and thus the level of the data voltage may be changed.

The display device DD may be driven mainly in the normal mode in a normal period NS in which the afterimage-causing image IM-1 is not displayed, and the display device DD may be driven mainly in the afterimage reduction mode in an afterimage-causing pattern display period AFS. However, at least one of the normal period NS and the afterimage-causing pattern display period AFS may include a variable period to switch the driving mode of the display device DD between the normal mode and the afterimage reduction mode.

In some example embodiments of the present invention, the display device DD may be driven in the normal mode in a partial period of the afterimage-causing pattern display period AFS. This partial period may be a period for determining whether the afterimage-causing image IM-1 is continuously displayed for a predetermined time or more.

Referring to FIG. 14, in an operation S210 of analyzing an image and an operation S220 of detecting an afterimage-causing pattern, the display device DD may analyze the converted image data R'G'B' (see FIG. 1) outputted from the signal controller 200 (see FIG. 1) and may determine whether the afterimage-causing image IM-1 is displayed or not by using the analyzed results.

In addition, the display device DD may select an operation S230 of driving the afterimage reduction mode or an operation S240 of driving the normal mode on the basis of the determined result. In some example embodiments of the present invention, the selection of the driving operation S230 or the driving operation S240 may be performed by the signal controller 200 (see FIG. 1).

According to some example embodiments of the present invention, it may be possible to inhibit or prevent characteristics of the transistor from being changed when a certain image is displayed for a long time in a certain portion of the display area. Thus, an afterimage may not be viewed to a user.

In addition, according to some example embodiments of the present invention, the level of the data voltage of the transistor may be adjusted to prevent the characteristics of the transistor from being changed, when the pattern in which the white color and the black color are repeated is displayed for a long time in the display area.

While aspects of some example embodiments of the present invention have been described, it will be apparent to those skilled in the art that various changes and modifications may be made without departing from the spirit and scope of the present invention. Therefore, it should be understood that the above embodiments are not limiting, but illustrative. Thus, the scope of the present invention is defined by the following claims and their equivalents, and shall not be restricted or limited by the foregoing description.

What is claimed is:

1. A display device comprising:
    a display panel comprising a display area configured to display an image, wherein the display area comprises a measurement area comprising a plurality of sub- measurement areas, and each of the plurality of sub-measurement areas comprises a plurality of pre-map areas;
    a data driver configured to provide data voltages to the display panel;
    a signal controller configured to:
        sequentially select the plurality of sub-measurement areas in response to a change in frame;
        calculate first average values respectively corresponding to the pre-map areas by using data voltages applied to the selected sub-measurement area at a first time point to generate first average value data;
        calculate second average values respectively corresponding to the pre- map areas by using data voltages applied to the selected sub-measurement area at a second time point after a predetermined time from the first time point to generate second average value data; and
        compare the first average value data with the second average value data to determine pre-map areas, the first average values of which are equal to the second average values thereof, among the pre-map areas; and
    a common voltage generator configured to provide a common voltage to the display panel,
    wherein an afterimage reduction mode is driven to change a level of the common voltage provided by the common voltage generator when the determined pre-map areas are adjacent to each other.

2. The display device of claim 1, wherein the display panel comprises:
    a liquid crystal layer;
    a plurality of pixel electrodes arranged to correspond to the liquid crystal layer and to which the data voltages are applied; and
    a common electrode arranged to correspond to the liquid crystal layer, which overlaps with the plurality of pixel electrodes, and to which the common voltage is applied.

3. The display device of claim 2, wherein the level of the common voltage is reduced.

4. The display device of claim 3, wherein each of the first average values and the second average values is an average value of a red data signal value, a green data signal value and a blue data signal value.

5. The display device of claim 3, wherein a level of each of the data voltages is reduced when the afterimage reduction mode is driven.

6. The display device of claim 3, further comprising:
    a gamma voltage generator configured to provide a plurality of gamma voltages to the data driver,
    wherein a level of each of the plurality of gamma voltages is reduced when the afterimage reduction mode is driven.

7. The display device of claim 3, wherein the measurement area is adjacent to an edge of the display area.

8. The display device of claim 3, wherein the measurement area is provided in plurality and the plurality of measurement areas comprises:
    a first measurement area in a top left portion of the display area;
    a second measurement area in a top right portion of the display area;
    a third measurement area in a bottom left portion of the display area; and
    a fourth measurement area in a bottom right portion of the display area.

9. The display device of claim 3, further comprising:
    a memory configured to store a first cumulative time for which the determined pre-map areas are adjacent to each other,
    wherein the afterimage reduction mode is driven when the first cumulative time is equal to or greater than a first time value.

10. The display device of claim 9, wherein the memory is further configured to store a second cumulative time for which the afterimage reduction mode is driven, and the level of the common voltage is further reduced when a sum of the first cumulative time and the second cumulative time is equal to or greater than a second time value greater than the first time value.

11. The display device of claim 1, wherein, when the signal controller detects that the image includes a pattern in which a white color and a black color are repeated, a difference in level between the common voltage and a data voltage corresponding to the white color is reduced.

12. A display device comprising:
    a display panel comprising:
        a liquid crystal layer;

a plurality of pixel electrodes arranged to correspond to the liquid crystal layer; and a common electrode arranged to correspond to the liquid crystal layer, wherein a display area configured to display an image is defined in the display panel;

a common voltage generator configured to provide a common voltage to the common electrode; and a data driver configured to provide a data voltage inverted with reference to the common voltage to the plurality of pixel electrodes, wherein a driving mode of the display device comprises:

an afterimage reduction mode driven when the image includes a pattern in which a white color and a black color are repeated; and a normal mode driven when the image does not include the pattern, and wherein an absolute value of a difference between a level of the common voltage and a level of the data voltage for displaying the white color in the afterimage reduction mode is smaller than an absolute value of a difference between a level of the common voltage and a level of the data voltage for displaying the white color in the normal mode.

13. The display device of claim 12, further comprising:

a signal controller configured to provide a data signal corresponding to the data voltage to the data driver, wherein the display area comprises a measurement area comprising a plurality of sub-measurement areas, and each of the plurality of sub-measurement areas comprises a plurality of pre-map areas, wherein the signal controller is configured to sequentially select the plurality of sub-measurement areas in response to a change in frame, wherein the signal controller is configured to calculate first average values respectively corresponding to the pre-map areas by using data voltages applied to the selected sub-measurement area at a first time point to generate first average value data, wherein the signal controller is configured to calculate second average values respectively corresponding to the pre-map areas by using data voltages applied to the selected sub-measurement area at a second time point after a predetermined time from the first time point to generate second average value data, wherein the signal controller is configured to compare the first average value data with the second average value data to determine pre-map areas, the first average values of which are equal to the second average values thereof, among the pre-map areas, and wherein a level of the common voltage provided by the common voltage generator is changed when the determined pre-map areas are adjacent to each other.

14. The display device of claim 13, wherein the level of the common voltage is reduced.

15. The display device of claim 14, wherein each of the first average values and the second average values is an average value of a red data signal value, a green data signal value and a blue data signal value.

16. The display device of claim 14, wherein the measurement area is adjacent to an edge of the display area.

17. The display device of claim 14, wherein the measurement area is provided in plurality and the plurality of measurement areas comprises:

a first measurement area in a top left portion of the display area;

a second measurement area in a top right portion of the display area;

a third measurement area in a bottom left portion of the display area; and a fourth measurement area in a bottom right portion of the display area.

18. The display device of claim 12, wherein the level of the common voltage is constant, and the level of the data voltage is changed.

19. The display device of claim 18, further comprising:

a gamma voltage generator configured to provide a gamma voltage corresponding to the data voltage to the data driver, wherein a level of the gamma voltage in the afterimage reduction mode is smaller than a level of the gamma voltage in the normal mode.

20. The display device of claim 19, further comprising:

a signal controller configured to provide a data signal corresponding to the data voltage to the data driver, wherein the signal controller is configured to analyze the data signal to select one of the afterimage reduction mode and the normal mode.

* * * * *